Aug. 3, 1926.
D. R. RICHIE
1,594,694
TWO-HORSE RIDING CULTIVATOR
Filed May 28, 1921
2 Sheets-Sheet 1
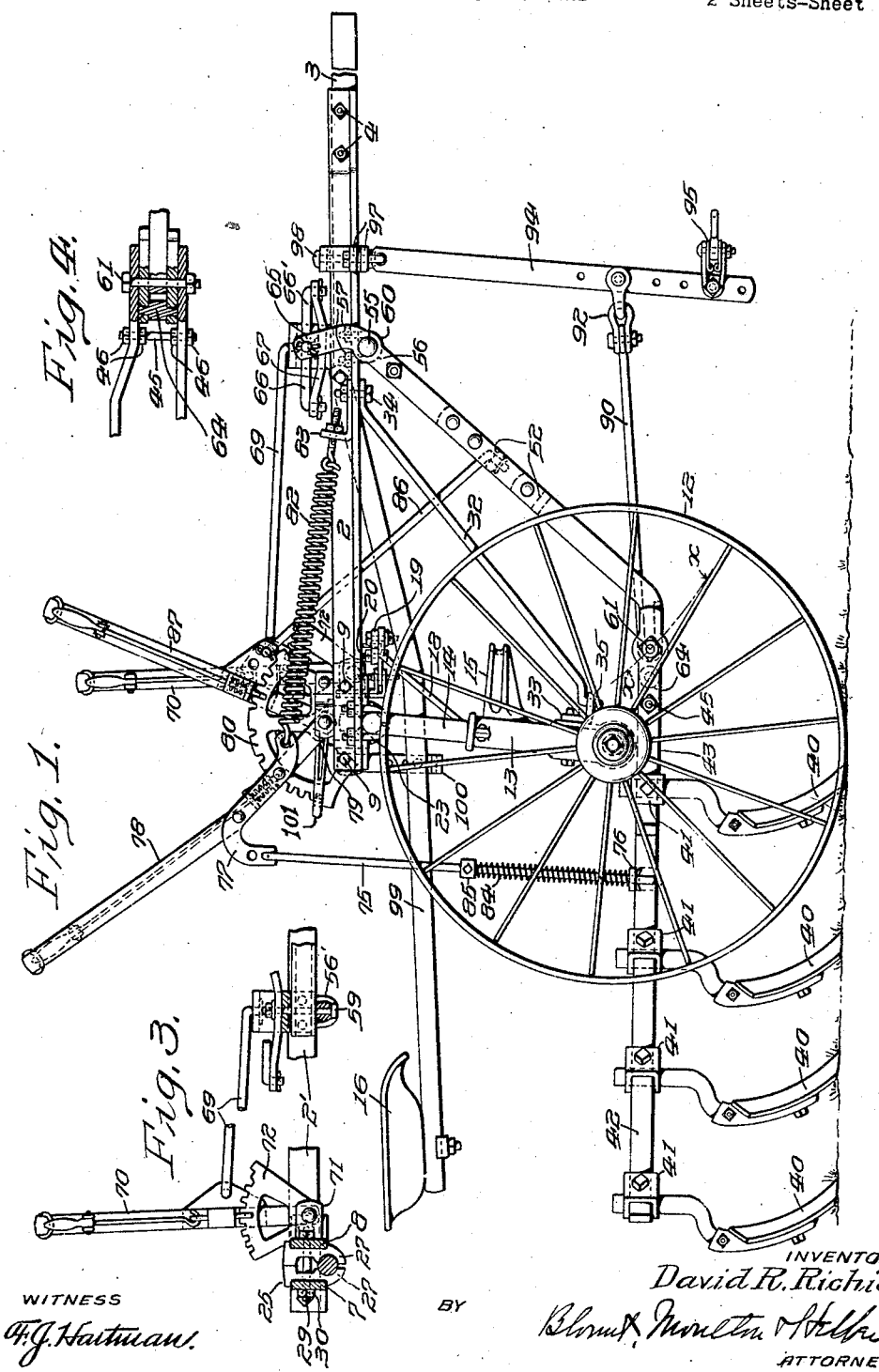
WITNESS
F.J. Hartman
INVENTOR
David R. Richie.
BY
Blount, Moulton & Helfrich
ATTORNEYS

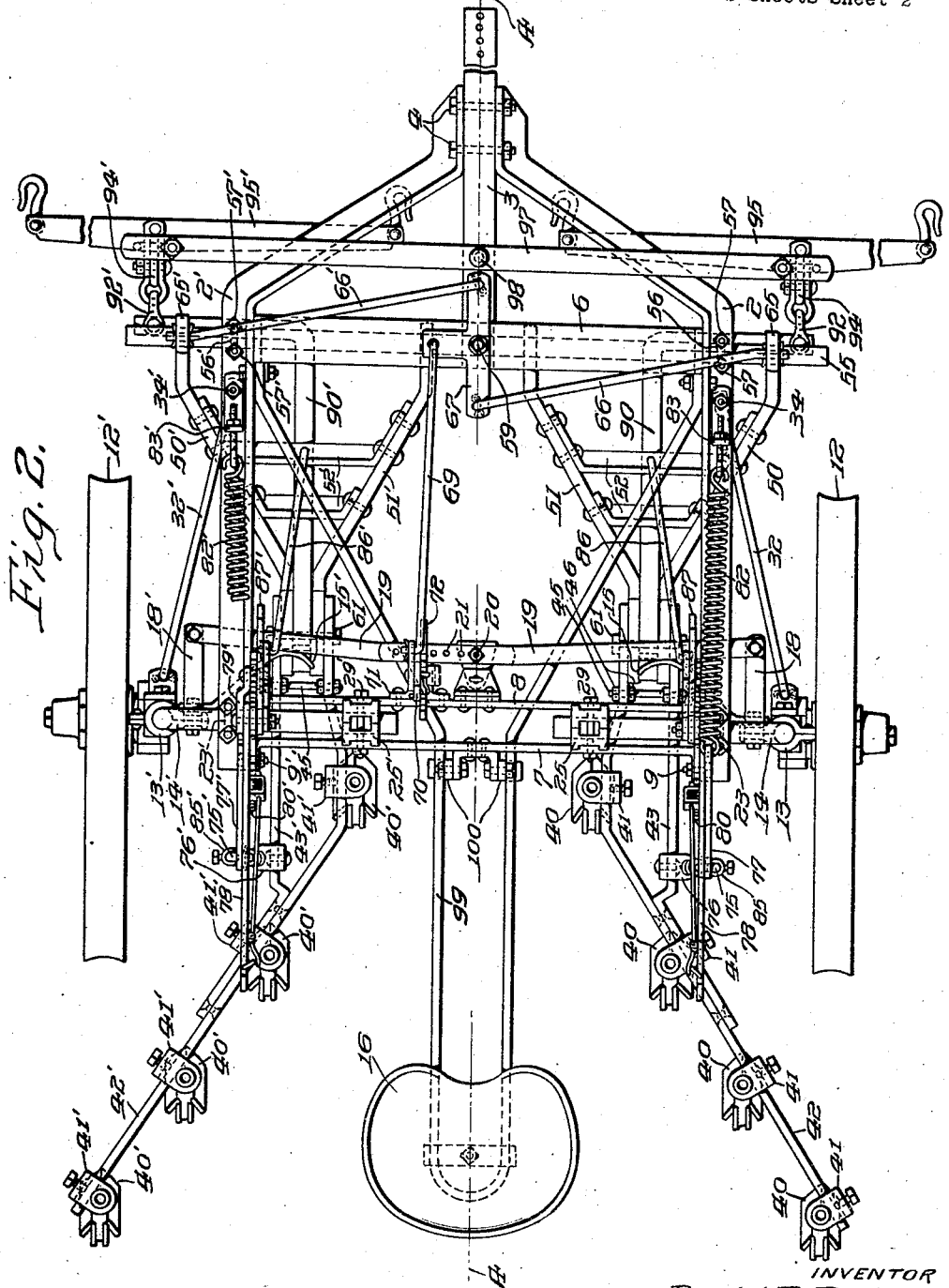

Patented Aug. 3, 1926.

1,594,694

UNITED STATES PATENT OFFICE.

DAVID R. RICHIE, OF LANSDOWNE, PENNSYLVANIA, ASSIGNOR TO S. L. ALLEN & CO. INC., A CORPORATION OF PENNSYLVANIA.

TWO-HORSE RIDING CULTIVATOR.

Application filed May 28, 1921. Serial No. 473,293.

The principal object of my invention is to provide a two-horse riding cultivator embodying means whereby the tool carrying gangs may be readily adjusted while the machine is in operation in such manner as to vary the vertical height of the cultivating or other ground working tools while maintaining the gang bars in such position that all of the tools will enter the soil for the same distance or which may be so operated as to adjust the gang bars in such manner that certain of the tools will enter the ground more deeply than others and also embodying means whereby the tool carrying gangs may be simultaneously adjusted outwardly or inwardly with respect to the center line of the machine to move the cultivating tools closer to or farther away from the row of plants which is being cultivated.

My invention further contemplates the provision in a cultivator of the character aforesaid of a rigid main frame to which the pole of the implement is at all times securely and fixedly attached, as well as means for readily effecting adjustment of the wheels in or out from the center line of the machine to adapt the machine for use under different operative conditions. The invention further comprises a novel means for rapidly and conveniently securing the wheel carrying members in place with respect to the main frame thereby facilitating adjustment of the wheels.

Additional objects of my invention are to generally improve and simplify cultivating implements of the general character of that to which reference has been made with a view to producing a strong, simple, easily operated and efficient two-horse riding cultivator embodying means for effecting adjustment of the various parts in such manner as to obtain the most efficient results under different conditions of operation thereby adapting the machine to a wide range of agricultural uses.

While for the purpose of attaining the objects of my invention. I may utilize various suitable instrumentalities and combinations thereof, I have in the accompanying drawing illustrated a preferred embodiment of means adapted therefor, Fig. 1 being a view in elevation of the right hand side of a cultivator constructed in accordance with my invention; Fig. 2 being a top plan view thereof, certain parts on the left hand side of the machine being omitted for the sake of clearness; Fig. 3 being a fragmentary view partially in vertical section and partially in side elevation of one of the control levers and certain of its connected parts removed from the machine, and Fig. 4 a fragmentary plan view partially in horizontal section illustrating a preferred manner of connecting the forward ends of the gang bars with the gang bar hangers and draft members. Like numerals are used to designate the same parts in the several figures, and as the machine is substantially symmetrical as regards the center line A—A and comprises certain corresponding elements on both sides thereof, such elements, have, as far as possible, been identically numbered with the addition of a prime (') where such elements are on the left hand side of the machine. It will therefore be understood that when in the following description a given part is referred to by its number as, for example, "12", it is not thereby intended to designate only that part on the right hand side of the machine, but the corresponding part, if any, upon the left hand side thereof as well.

The particular machine shown in the drawings comprises a rigid main frame having substantially horizontally disposed side frame members 2 conveniently formed of angle iron and disposed with one flange in the horizontal and the other in the vertical plane, each of which is directed angularly inward at the front and thence parallel to the center line of the machine to contact with the side of the pole 3 which is rigidly secured to the frame members by the bolts 4. The pole extends forwardly from the frame members in the ordinary manner for a sufficient distance to lie between the horses when harnessed to the implement under which conditions its forward end will be maintained at a substantially fixed height. The pole also is extended rearwardly for a sufficient distance to project beneath a horizontally disposed transversely extending cross member 6 rigidly secured between the side frame members adjacent the forward part of their longitudinally extending portions. The rear ends of the side frame members are rigidly tied together by means of a pair of transversely extending longitudinally spaced cross tie bars 7 and 8 preferably disposed with their greatest width in the vertical plane, the ends of each bar being turned at right angles to the main portion thereof and secured to the side frame members by bolts 9. The frame when constructed in the manner just described is extremely rigid and affords a solid and non-yielding support for the pole and for the attachment of the other parts of the implement hereinafter described.

The main frame is operatively supported on ground wheels 12 disposed on opposite sides thereof and rotatably mounted on stub axles, each preferably disposed adjacent the lower end of a socket member 13 which in turn is effective to receive the downwardly directed end of an L-shaped socket support 14 preferably circular in cross section and adapted to enter the socket and form a working fit therein, a preferred form of socket and axle forming the subject of an application for Letters Patent of the United States filed of even date herewith by William C. Warren and George L. Kier, said parts being fully described and claimed therein. The downwardly directed portion of the socket support terminates at a suitable distance within the socket and preferably rests on anti-friction means disposed therein so that the socket is readily revoluble about the support, and for the purpose of providing means whereby the socket and in turn the wheels may be conveniently moved about the support for steering the implement, a foot rest 15 is secured to each socket and directed substantially inward therefrom in such position that when the operator is seated on the seat 16 his feet will rest in a natural position on the foot rests. In order that both wheels will move in unison, an arm 18 is extended upwardly and forwardly from each socket and the free ends of the arms connected by a link preferably comprising similar members 19 extending inwardly from each arm and overlapping at their innermost extremities where they are united by a bolt 20 passing through suitable holes therein. By providing a plurality of these holes 21 a capacity for adjustment is afforded so that when the wheels are moved in or out from the center line of the machine the length of the link may be correspondingly varied so as to maintain the wheels at all times substantially parallel with each other.

Suitable means are provided for maintaining the axle supports in operatively rigid relation with the frame while affording capacity for suitable adjustment of the supports in or out with respect thereto, said means preferably comprising a U-shaped clip 23 having its ends extended through the frame and secured thereto in such position that the curved portion of the clip will extend therebelow to receive the adjacent horizontally disposed portion of the socket support and a clamp 25 of peculiar construction disposed between cross ties 7 and 8. This clamp which is well shown in Fig. 3 comprises a pair of complementary jaws 27, the outer face of each of which is recessed so as to fit over the adjacent tie 7 or 8 while the lower part of the inner opposed face of each jaw is cut out so as to provide a substantially semi-cylindrical opening, the two jaws thus forming a substantially cylindrical aperture for the reception of the socket support. Extending through both of the ties and the jaws is a horizontally positioned bolt 29 carrying a nut 30, the arrangement being such that when the latter is drawn up against the outer face of the tie 7 the ties and the jaws will be drawn together sufficiently to cause the latter to grip and rigidly hold the socket support so that the support may be retained in position with respect to the tie members and in turn the frame to maintain any desired adjustment of the adjacent wheel, while by loosening the bolt the adjustment may be readily varied as required. To assist in maintaining the axle supports and wheels in proper position a stay rod 32 is arranged to extend angularly downward from the under side of each of the members of the frame to a lug 33 carried by each socket, the upper end of the rod being somewhat loosely secured to the frame by a bolt 34 and the lower end of the rod being extended through the lug and retained in position by a cotter pin 35 or in any other convenient manner so that when the wheel is moved in or out the rod is free to move about the bolt 34 and also in the lug. It will be observed that as the rod is of fixed length, a movement of the wheel outwardly from the position shown in the drawings will result in a slight forward movement of the socket and consequent axial revolution of the horizontal portion of the socket support so that the vertical portion of the socket support instead of being slightly inclined toward the back of the machine as shown in Fig. 1 will be either more nearly vertical or else inclined forward of the vertical, depending on the distance which the wheel has been moved away from the center line of the machine.

The cultivating tools 40 are adjustably supported by suitable clamps 41 on a pair of gang bars disposed on opposite sides of the center line of the machine. These gang bars are of somewhat peculiar construction each comprising a main portion 42 and an auxiliary portion 43. The major part of the portion 42 is arranged so as to diverge angularly outwardly and rearwardly and on this part of the bar the greater number of tools are ordinarily carried, three being shown in the drawing. At the forward termination of this angularly disposed portion the bar is directed longitudinally forward, thence angularly outward and again forward as clearly shown in Fig. 2, the first of these longitudinally directed portions being effective to support an additional tool. The auxiliary portion 43 of the bar is riveted or otherwise fixedly secured to the main angularly disposed portion and from thence extends longitudinally forward parallel to the forward portion of the main part of the bar with which it is maintained in such relation through the medium of a transversely extending bolt 45 passing horizontally through both portions of the bar and having nuts 46 threaded thereon against the inner and outer faces of each portion of the bar, the forward ends of each of the gang bars being adjustably supported through the medium of gang bar hangers now to be described.

Each of these gang bar hangers preferably consists of a pair of substantially complementary members 50 and 51 rigidly secured together through the medium of stay bars 52 and extending angularly upward and forward from each of the gang bars to a transversely extending hanger supporting rod 55 which is rigidly positioned transversely of the machine preferably beneath the cross member 6 and in contact with the under side of the side frame members 2 to which the rod is preferably secured by U-shaped clips 56 surrounding the rod, extending through the frame members and secured in position by nuts 57. Additionally, to prevent the rod from turning axially, a vertically positioned bolt 59 extends through the rod and cross member 6, as well as preferably through the end of the pole, as clearly shown in Fig. 3. Each gang bar hanger is preferably substantially V-shaped in planary outline with its widest part adjacent the supporting rod, the forward ends of the members 50 and 51 being directed normal to the axis of the rod, drilled to permit its passage therethrough and preferably enlarged adjacent this point to provide a boss 60 for the purpose of adding strength, while the rear ends of the members are also directed longitudinally of the machine and brought together so as to rest snugly between the forwardly projecting ends of the adjacent gang bar, a horizontally positioned bolt 61 extending through the hanger members and the members of the gang bar serving to hold the parts in position while permitting relative pivotal movement of the parts about the bolt. A spacer block 64 is preferably interposed between the extreme rear ends of the hanger members and serves the double purpose of holding them against the inner faces of the gang bar members and also of preventing them from approaching each other which might tend to cause binding or cramping of the parts.

The forward extremity of each of the members 50 is turned vertically upward above the supporting rod to form an ear 65 through which extends the outer end of a shifter link 66, the other end of which is connected with one arm of a horizontally positioned three armed lever 67 rotatively supported above cross member 6 on the bolt 59 which serves as a pivot therefor. This lever is so formed that the arms to which the shifter link is connected extend in opposite directions substantially longitudinally of the machine while the third arm extends at right angles to the other arms and subtantially crosswise of the machine. From this arm a shifter rod 69 extends rearwardly to the shifter lever 70 which is positioned a little to one side of the center line of the machine and carried by a suitable bracket 71 fixed to the cross tie member 8, the bracket also serving to support a notched segment 72 with which the lever is cooperative through suitable latching mechanism. The arrangement of the several parts hitherto described is such that movement of the lever 70 is operative to shift the gang bar hangers simultaneously in or out along the supporting rod in opposite directions which in turn is effective to similarly move the gang bars and thus move the cultivating tools nearer to or farther away from the row of plants which is being cultivated.

The rear end of each gang bar is preferably supported through the medium of a hanger rod 75 having its lower end extended loosely through a clip 76 carried by the bar and its upper end attached to a lug or ear 77 carried by an adjusting lever 78 pivotally supported on a bracket 79 bolted to a notched segment 80 in turn bolted to the frame adjacent the cross ties 7 and 8, the lever 78 through suitable latching mechanism being cooperative with the notches on the rear part of the segment, so that by raising and lowering the lever the rear end of the subjacent gang bar may be correspondingly depressed or elevated. A counterbalance spring 82 is preferably interposed between the lever and a suitable clip 83 supported on the frame so as to counterbalance to some extent the weight of the gang bar and the spring 84 is preferably arranged to surround the hanger rod between the clip 76 and an adjustable collar 85 carried by the rod, this spring serving to assist in forcing the cultivating tools into the ground while permitting the clip 76 to slide up on the hanger and compress the spring in case of the tools striking a stone or other obstruction.

In order to maintain the forward ends of the gang bars at the desired point of vertical adjustment, suitable means are provided preferably comprising a link 86 extending rearwardly and upwardly from each of the gang bar hangers conveniently from about the center of one of the stays 52 to a lever 87 preferably pivoted coaxially with the lever 78 and cooperative through suitable latching mechanism with notches in the forward part of the segment 80 so that by suitable movement of the lever the subjacent gang bar hanger may be moved vertically about the axis of the supporting rod 55 as a center which in turn is effective to elevate or depress the forward end of the adjacent gang bar. It will of course be evident that as each hanger moves about a fixed center, the bolt 61 which serves to secure it to the gang bar will necessarily move along an arc X—X so that as the hanger is lowered from the position shown in the drawing the forward end of the gang bar will be depressed and the bar simultaneously shifted forwardly for a predetermined distance depending on the amount which the hanger is lowered. Simultaneously, since the gang bar during this movement substantially fulcrums at the clip 76 the rear end of the bar will be correspondingly elevated and the whole bar thus assume an angular position from which, however, it may be readily readjusted to a horizontal one by suitable manipulation of the lever 78 to lower the rear end of the bar. In practice while ordinarily the gangs are maintained in substantially horizontal position, it is frequently desirable to adjust them to an angular one in which either the forward or rear end of the bar is elevated and it will be evident that by suitable manipulation of the levers 78 and 87 each gang bar may be caused to assume any desired position either angular or horizontal within the limits of movement afforded by the machine so that the bars may be readily raised or lowered or inclined so that the foremost tools will enter the ground more deeply than the rearmost tools, or vice versa, as may be required by operative conditions.

In order that the draft of the team may be imparted directly to the gang bars and substantially in the plane thereof so as to avoid any tendency for the tools to run out of the ground, a draft link 90 is preferably hooked over each of the bolts 61 to extend substantially horizontally forwardly therefrom to a point substantially beneath the supporting rod 55 where the link is turned outwardly at right angles to its main portion to terminate a suitable distance from the center line of the machine, the outer end of the link being connected through suitable eyes 92 with a vertically positioned whiffletree hanger 94. To the lower end of the whipple-tree hanger is connected a whipple-tree 95 having its upper end loosely supported at the outer extremity of a transversely extending cross member 97 preferably formed of a pair of bars positioned respectively above and below the side frame members and pole and secured to the latter by a vertically extending bolt 98, the parts being arranged so that the hangers are disposed in substantially vertical position.

Conveniently the operator's seat 16 is secured at the end of a U-bar 99 the forward ends of which are spread apart and bolted to the side frame members 2, U-shaped members 100 carried by the cross tie member 7 serving to afford vertical support thereto.

It will be evident that when a cultivator constructed substantially as hereinbefore described is hitched to a team of horses in the ordinary manner and drawn forwardly by them, the draft will be communicated very directly to the gang bars whatever be the adjusted position of the gang bar hangers and their supporting rods, and that the hangers, and in turn the gang bars, may be very readily and simultaneously adjusted in or out to bring the tools into conformity with the rows being cultivated. Additionally the distance between the wheels may be readily changed by suitable movement in or out of the socket supports 14 and the gang bars raised or lowered vertically and adjusted either to angular or horizontal position by suitable manipulation of levers 78 and 87 either consecutively or simultaneously, independently of and whatever may be the adjusted position of the gang bar hangers on the supporting rod. Moreover, when the end of a row is reached and it is desired to lift the gang bars to temporarily raise the tools from the ground while the implement is being turned during which operation the operator ordinarily assists the team by steering the implement wheels by means of the foot rests 15, the same may be readily accomplished by lifting the levers 78 without disturbing the position of the levers 87 and as I preferably provide the rack 80 with an adjustable stop 101 which may be readily engaged in any desired notch, the gangs may be again lowered to their original position after the turning operation is completed by lowering the levers until they engage the previously adjusted stop thus relieving the operator of the necessity of selecting the proper notch to insure the proper position of the gang.

While I have herein described with considerable particularity a preferred embodiment of my invention I do not thereby desire or intend to limit myself to any precise details of construction and arrangement of parts as the same may be modified and varied in minor particulars from those shown in the drawings and herein described without departing from the spirit and scope of the invention as defined in the appended claims.

Having thus described my invention, I claim and desire to protect by Letters Patent of the United States:

1. In an implement of the class described, the combination with a rigid frame, of a plurality of tool carrying gangs, independently operable means for vertically adjustably suspending the rear end of each gang from the frame, means for vertically adjustably suspending the forward end of each gang from the frame, said last mentioned means being operable independently of or simultaneously with said first mentioned means to adjust the vertical position of the gang, and means for effecting a simultaneous adjustment of both of said gangs toward or away from the center line of the machine independently of the vertically adjusted positions of said gangs.

2. In a machine of the class described, the combination of a rigid frame, a pole rigidly secured thereto, a plurality of tool carrying gang bars beneath the frame, ground wheels supported on each side of the frame, a transversely extending hanger supporting rod rigidly secured to the frame, gang bar hangers slidable on said rod and extending downwardly and rearwardly therefrom to the gang bars, means for effecting simultaneous adjustment of the hangers in or out from the center line of the machine, and manually operable means comprising separate hand levers for independently adjusting the vertical height of the forward and rear ends of each gang bar in any laterally adjusted position of the hangers.

3. In a machine of the class described, the combination with a rigid frame and a pole rigidly secured thereto, of a pair of ground wheels positioned on opposite sides of the frame, a plurality of tool carrying gang bars positioned beneath the frame, a transversely extending hanger rod rigid with respect to the frame, downwardly and rearwardly depending hangers extending from said rod to said gang bars, means for effecting simultaneous movement in opposite directions of said hangers on said rod, and manually operable means adapted to effect independent vertical adjustment of the forward and rear ends of each gang bar independently of the adjusted position of said hangers on said rod.

4. In a machine of the class described, the combination of a rigid substantially horizontally positioned main frame, a ground wheel positioned at each side thereof, means for supporting said wheels from said frame, a transversely extending hanger rod rigidly secured beneath the forward portion of said frame, V-shaped hangers slidable on said rod and extending downwardly and rearwardly therefrom, a tool carrying gang bar attached to and vertically movable with respect to each hanger, manually operable means for raising or lowering each hanger to effect vertical adjustment of the forward end of the adjacent gang bar, and manually operable means adapted to effect vertical adjustment of the rear end of each gang bar.

5. In a machine of the class described, the combination of a rigid substantially horizontally positioned main frame, a ground wheel positioned at each side thereof, means for supporting said wheels from said frame, a transversely extending hanger rod rigidly secured beneath the forward portion of said frame, V-shaped hangers slidable on said rod and extending downwardly and rearwardly therefrom, a tool carrying gang bar attached to and vertically movable with respect to each hanger, manually operable means for raising or lowering each hanger to effect vertical adjustment of the forward end of the adjacent gang bar, manually operable means adapted to effect vertical adjustment of the rear end of each gang bar, and manually operable means adapted to simultaneously slide said hangers on said rod in opposite directions independently of the vertically adjusted height of said hangers.

In witness whereof, I have hereunto set my hand this 26th day of May, 1921.

DAVID R. RICHIE.